US006922658B2

(12) United States Patent
Bohizic et al.

(10) Patent No.: US 6,922,658 B2
(45) Date of Patent: Jul. 26, 2005

(54) METHOD AND SYSTEM FOR TESTING THE VALIDITY OF SHARED DATA IN A MULTIPROCESSING SYSTEM

(75) Inventors: Theodore J. Bohizic, Hyde Park, NY (US); Mark H. Decker, Rhinebeck, NY (US); Ali Y. Duale, Poughkeepsie, NY (US); Shailesh Ratilal Gami, Poughkeepsie, NY (US); Vincent L. Ip, New York, NY (US); Dennis W. Wittig, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 10/404,489

(22) Filed: Mar. 31, 2003

(65) Prior Publication Data

US 2004/0199363 A1 Oct. 7, 2004

(51) Int. Cl.$^7$ .............................................. G06F 11/30
(52) U.S. Cl. ....................................... 702/186; 717/124
(58) Field of Search ........................... 702/80, 119, 120, 702/122, 123, 182, 183, 185, 186, 187, 189; 714/11, 52; 712/215, 219; 717/108, 111, 114, 121, 124, 131, 168

(56) References Cited

U.S. PATENT DOCUMENTS

| 5,555,391 | A | * | 9/1996 | De Subijana et al. ....... 711/113 |
| 5,852,727 | A | | 12/1998 | Narayan et al. ............ 712/215 |
| 6,240,508 | B1 | | 5/2001 | Brown, III et al. ......... 712/219 |
| 6,275,980 | B1 | * | 8/2001 | Uchihira et al. ............ 717/124 |

OTHER PUBLICATIONS

William W. Collier, "Seeing Architecture Failures;" Reasoning About Parallel Achitectures; 1992; pp. 1–9.
A. Saha, J. Lin, C. Lockett, N. Malik, and U. Shamsi; "Test Floor Verification of Multiprocessor Hardware;" IEEE 1996 pp. 373–377.
J. Yen, M. Sullivan, C. Montemayor, P. Wilson, R. Evers; "Overview of PowerPC 620 Multiprocessor Verification Strategy;" IEEE 1995; pp. 167–174.

\* cited by examiner

Primary Examiner—Marc S. Hoff
Assistant Examiner—Mohamed Charioui
(74) Attorney, Agent, or Firm—Andrew J. Wojnicki, Jr.; Cantor Colburn LLP

(57) ABSTRACT

A method for a method for testing the validity of shared data in a multiprocessing system is disclosed. The method comprises receiving at a first central processing unit a list of fetch and store instructions associated with blocks in a shared memory location. The list includes a data value, a central processing unit identifier and a relative order associated with the instructions. In addition, one of the data values associated with one of the instructions was stored by a memory-to-memory, memory-to-register or register-to-memory operation. Further, one of the central processing unit identifiers associated with one of the instructions is an identifier corresponding to one of a plurality of central processing units that have access to the shared memory location including the first central processing unit. A fetch operation is performed at a block in the shared memory location from the first central processing unit. Fetched data is received at the first central processing unit in response to the performing, where the fetched data was stored by one of the plurality of central processing units. The method verifies that the fetched data conforms to a block concurrency rule in response to the list and that the fetched data conforms to a serialization rule in response to the list.

32 Claims, 4 Drawing Sheets

```
begin
  while ((|S| > 0) ∧ (¬ERROR))/*processing instruction stream for one CPU*/
    get(I ∈ S)  /* get instruction from the stream*/
202   S = S-I;
    if (Type(I) = F(M)) /* fetch type instruction*/
204     FOUND = False;
      ValidData = False;
      UniqueData = True;
      i = 1;
206   while((i ≤ MaxCPU) ∧ (UniqueData=True))
208     if (D ∈ $L_{CPU_i}$)/* data is in $CPU_i$ list*/
          ValidData = True;
        j = 0;
210     while ((j ≤ MaxCPU) ∧ (UniqueData = True))
          if ((D∈ $L_{CPU_j}$ )∧ (i ≠ j))
            UniqueData = False;
          j = j + 1;
212     if (UniqueData=True)
          j = 0;
          while ((¬FOUND) ∧ (j < |$L_{CPU_i}$|))
            let d = $L_{CPU_i}$ (j)
            if (d ≠ D)
              $L_{CPU_i}$ = $L_{CPU_i}$-d;
            else
              FOUND = True;
            j = j + 1;
        i = i + 1;
214   if (ValidData=False)
        ERROR = True;
end
```

FIG. 2

302 — for each pair $CPU_a$ and $CPU_b$

304 — {x = a; y = b;
    do steps 1 and 2;/*build CRPs for $CPU_b$ and check $CPU_b$ fetches against $CPU_a$ stores*/

306 — {x = b; y = a;
    do steps 1 and 2;/*build CRPs for $CPU_a$ and check $CPU_b$ fetches against $CPU_a$ stores*/
    end for;

step 1: create CRPs for $CPU_y$
308 — for each $(FCPU_x(M) \in St_{CPU_y}(M))$/* for each $CPU_x$ fetch of data stored by $CPU_y$ into M*/
    if $(\exists OW(M)_{CPU_y})$/* other stores of $CPU_y$ that could overwrite M did not take place*/
        create/update CRP = $(Ser_i, CPU_x, Ser_j, CPU_y)$;
    end if;
    end for;

step 2: check $CPU_y$ fetches agains: $CPU_x$ stores and CRPs:
310 — for each $(FCPU_x(M) \in St_{CPU_y}(M))$/*for each $CPU_x$ fetch of data stored by $CPU_y$ into M*/
    if $(\exists(Ser_i, CPU_x, Ser_j, CPU_y))$: $Ser_j, CPU_y \le address(f))$/* A CRP proceeds the fetch*/
        if $(f \notin S(Ser_i, CPU_x))$/*data is known to be overwritten before $CPU_x$ reached $Ser_j$*/
            $CPU_y$ violated serialization rules
        end if;
    end for;
    end if;

FIG. 3

METHOD AND SYSTEM FOR TESTING THE VALIDITY OF SHARED DATA IN A MULTIPROCESSING SYSTEM

BACKGROUND OF THE INVENTION

The present disclosure relates generally to a method and apparatus for testing the validity of shared data in a multiprocessing system, and particularly to a method and apparatus for random testing data block concurrency, execution sequence and serialization in multiprocessing systems in response to pseudo-random instruction streams.

In a typical multiprocessing environment, a number of central processing units (CPUs) share data residing in a particular location of the main/cache memory. These CPUs may be required to obey certain rules such as block concurrency, execution order and serialization. The block concurrency rule states that while a given CPU is fetching from or storing into a block of shared memory, the operation must be done in indivisible units. For example, if a fetch unit is four bytes, then the CPU is not allowed to fetch the data in two or one byte increments. The execution order rule requires that all stores and fetches are executed in order. In addition, the serialization rule refers to the ability of the CPU to use pre-fetched data until the CPU serializes, at which point it discards all pre-fetched data and completes all pending stores before it executes new fetches.

An access by an instruction to a memory location may be a fetch, a store or an update. In the case of the fetch access, the instruction does not alter the contents of the memory location. In contrast, the store access type instruction modifies the contents of the memory location. An instruction that fetches from and then stores into the same memory location performs an update access type. An update access operation can be viewed as a fetch operation followed by a store operation.

Several random test methodologies regarding cache coherence of the weakly-ordered (e.g., Reduced Instruction Set Computer (RISC)) architecture, such as PowerPC, have been reported in the literature. In the data-coloring technique, each store operation writes unique data into the common memory location. In this method if instructions storing into the shared locations are allowed to access a storage location consisting of a combination of shared and non-shared locations, one has to account for the worst case and thus limit store operations affecting these shared locations to 256 (maximum number of distinct data colors that can be represented with one byte). Therefore, the number of instructions of a given CPU that could write into the shared location becomes severely limited as the number of CPUs increases. The use of monotonic input data for multiprocessors and analyzing the terminal results is a special case of the data coloring technique. The false sharing method partitions the shared memory location such that different CPUs store into and fetch from non-overlapping locations. Other approaches force synchronization instructions before each store operation that stores into the shared location. However, these techniques concentrate on weakly-ordered architectures such as PowerPC and do not consider when arithmetic and logic operations engage in register-to-memory, memory-to-register, register-to-memory or memory-to-memory data transfer operations. Furthermore, the fact that an instruction stream and translation tables can be subject to modifications due to the actions of some CPUs are not taken into account.

In the case of a firmly-ordered architecture (e.g., Complex Instruction Set Computer (CISC)), such as IBM's System 390 architecture, a store operation executed by an instruction can take place (as seen by other CPUs) only after all the preceding store operations are completed. Furthermore, both logical and arithmetic operations of the IBM System 390 architecture can involve register-to-memory, memory-to-register and memory-to-memory operations. However, unless another CPU observes, one cannot conclude that any of the store operations of a given CPU are completed. Hence, determining the validity of the fetched data from a memory location is complicated when more than one CPU may have stored data into that location. Data fetched by a $CPU_i$ from a memory location M which has been subject to a number of store operations by different CPUs may not adhere to certain rules such as the block concurrency, execution order and serialization rules.

SUMMARY OF THE INVENTION

In one embodiment, a method for testing the validity of shared data in a multiprocessing system is disclosed. The method comprises receiving at a first central processing unit a list of fetch and store instructions associated with blocks in a shared memory location. The list includes a data value, a central processing unit identifier and a relative order associated with the instructions. In addition, one of the data values associated with one of the instructions was stored by a memory-to-memory, memory-to-register or register-to-memory operation. Further, one of the central processing unit identifiers associated with one of the instructions is an identifier corresponding to one of a plurality of central processing units that have access to the shared memory location including the first central processing unit. A fetch operation is performed at a block in the shared memory location from the first central processing unit. Fetched data is received at the first central processing unit in response to the performing, where the fetched data was stored by one of the plurality of central processing units. The method verifies that the fetched data conforms to a block concurrency rule in response to the list and that the fetched data conforms to a serialization rule in response to the list.

In another embodiment, a computer program product for testing the validity of shared data in a multiprocessing system is disclosed. The computer program product comprises a storage medium readable by a processing circuit and storing instructions for execution by the processing circuit for performing a method. The method comprises receiving at a first central processing unit a list of fetch and store instructions associated with blocks in a shared memory location. The list includes a data value, a central processing unit identifier and a relative order associated with the instructions. In addition, one of the data values associated with one of the instructions was stored by a memory-to-memory, memory-to-register or register-to-memory operation. Further, one of the central processing unit identifiers associated with one of the instructions is an identifier corresponding to one of a plurality of central processing units that have access to the shared memory location including the first central processing unit. A fetch operation is performed at a block in the shared memory location from the first central processing unit. Fetched data is received at the first central processing unit in response to the performing, where the fetched data was stored by one of the plurality of central processing units. The method verifies that the fetched data conforms to a block concurrency rule in response to the list and that the fetched data conforms to a serialization rule in response to the list.

In a further embodiment, a system for testing the validity of shared data in a multiprocessing system is disclosed. The system comprises a plurality of central processing units including a first central processing unit and a shared memory location accessed by the plurality of central processing units. The system further comprises application software located on the first central processing unit for implementing a method comprising receiving at the first central processing unit a list of fetch and store instructions associated with blocks in the shared memory location. The list includes a data value, a central processing unit identifier and a relative order associated with the instructions. In addition, one of the data values associated with one of the instructions was stored by a memory-to-memory, memory-to-register or register-to-memory operation. Further, one of the central processing unit identifiers associated with one of the instructions is an identifier corresponding to one of the plurality of central processing units that have access to the shared memory location including the first central processing unit. A fetch operation is performed at a block in the shared memory location from the first central processing unit. Fetched data is received at the first central processing unit in response to the performing, where the fetched data was stored by one of the plurality of central processing units. The method verifies that the fetched data conforms to a block concurrency rule in response to the list and that the fetched data conforms to a serialization rule in response to the list.

BRIEF DESCRIPTION OF THE DRAWINGS

Referring to the exemplary drawings wherein like elements are numbered alike in the accompanying Figures:

FIG. 2 is an exemplary embodiment of an algorithm that may be utilized to test for block concurrence;

FIG. 3 is an exemplary embodiment of an algorithm for testing machine compliance to serialization rules.

DETAILED DESCRIPTION OF THE INVENTION

Figure 1:
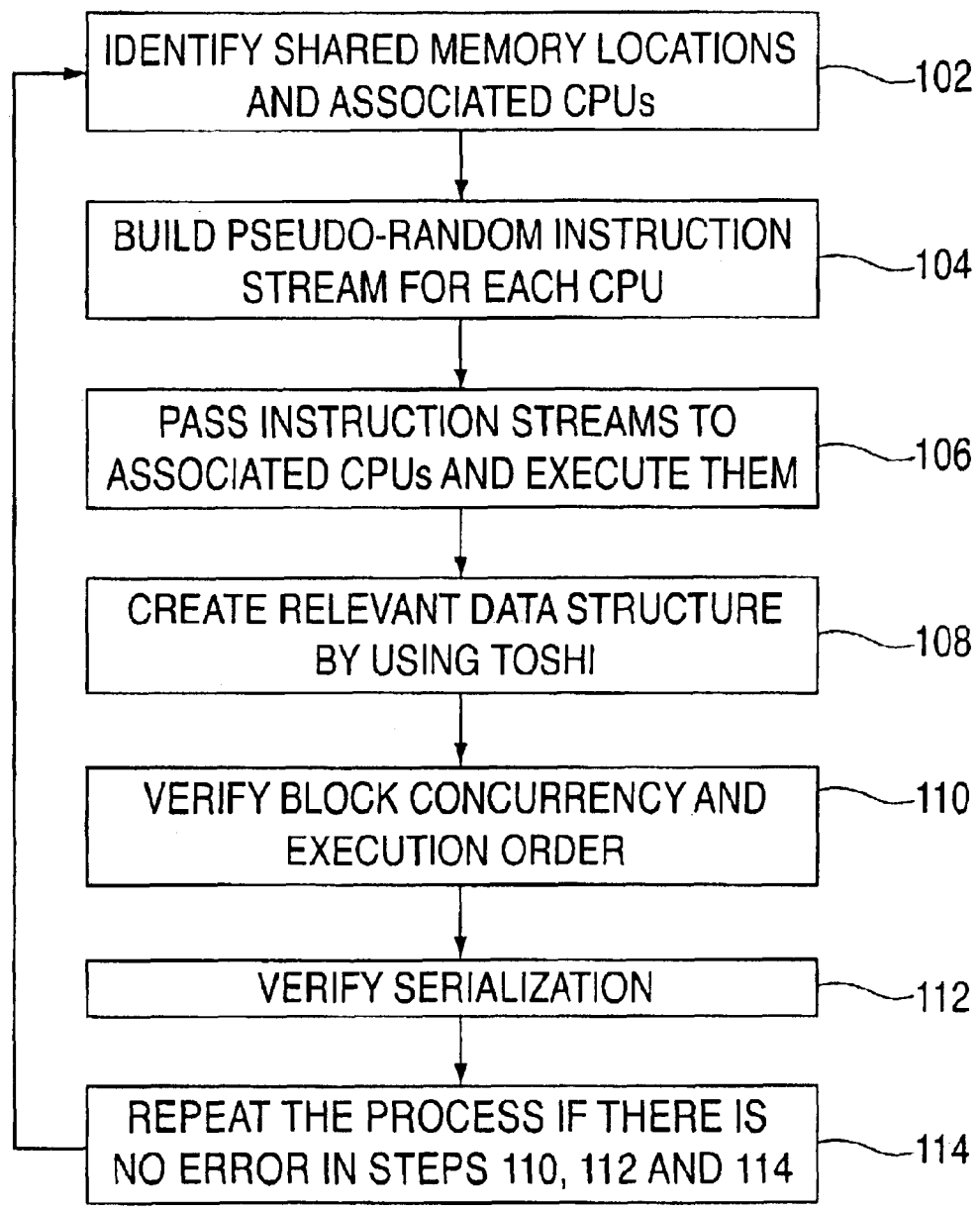
FIG. 1 is a block diagram of a high level process flow for an exemplary embodiment of the present invention.

An exemplary embodiment of the present invention provides a method of testing the validity of data fetched by a given CPU from storage locations that are subject to store and/or update operations by multiple CPUs. This includes both load and store operations as well as arithmetic and logical operations. The conformance of a machine to the block concurrence, order of execution and serialization rules is verified. In an exemplary embodiment of the present invention, it is assumed that prior to the analysis, the order in which the CPUs access the shared location is not known (i.e., time relationship among the CPUs is not available). FIG. 1 is a block diagram of a high level process flow for an exemplary embodiment of the present invention. The high level process flow depicts an exemplary method for testing of the validity of shared data in a multiprocessing system. At step 102, the shared memory locations are identified. At step 104, a pseudo-random test instruction stream is built for each CPU. These pseudo-random streams include instructions that fetch and store into the shared memory locations. A table of shared information (TOSHI) is built at step 104. When an instruction is selected to access a shared location, a TOSHI entry is created for that instruction. A TOSHI entry includes information such as the instruction address, the target address of the data, the source address of the data, any registers involved in the shared location and any associated flags (e.g., an execution flag). It is assumed that instructions are executed by their respective CPUs and not in a simulation environment. If simulation is available the TOSHI will contain less information.

In an embodiment of the present invention, a single operation accessing a shared location may simultaneously write to or read from a combination of shared and non-shared locations. For example, if the instruction stores four bytes into the memory, the following combinations are possible: all four bytes are part of a shared location; three bytes are part of a shared location and the other byte is part of a non-shared location; two bytes are part of a shared location and the other two bytes are part of a non-shared location; one byte is part of a shared location and the other three bytes are part of a non-shared location; or all four bytes are from a non-shared location. In other words, an embodiment of the present invention allows processors to share up to the bit level. In addition, in an embodiment of the present invention, when an instruction fetches data from a shared location, the data is protected (i.e., is not overwritten) until it is made observable by another store operation. For example, if instruction "I" fetches from a shared location "B" and stores the data into "A", where "A" is a register, the register is marked (via TOSHI flags) that it contains data that needs to be observed. Therefore, until another store-type instruction uses the register and stores into a non-shared location, no instruction can overwrite the data contained by this register. To maintain the randomness of the instruction stream, a number of randomly selected instructions is inserted into the stream between the point where an instruction fetches from a shared location and when the fetched data is made observable.

At step 106, the stream of instructions are passed to their respective CPUs. The streams are then executed by their respective CPUs. New pseudo random streams of instructions are built and passed to the CPUs if no error is detected in the previous streams. At step 108, relevant data information is gathered from the execution as directed by the entries in the TOSHI. In an exemplary embodiment of the present invention, the relevant data structure extracted from TOSHI includes lists containing the data stored by each CPU to each shared memory location and the addresses of instructions that are storing into or fetching from the shared location, the addresses of the source or observable (i.e., known or resultant) data, and those instructions that cause serialization. At step 110, conformance to block concurrency rules is verified. The block concurrency rule checks that a CPU stores and fetches in indivisible units (e.g., half-word, double-word). In addition, at step 110, conformance to the execution order rules is verified. Execution rules refer to the requirement that all stores and fetches to the shared memory location should be performed in order. Conformance to serialization rules is verified at step 112. Serialization occurs when a CPU is required to discard all pre-fetched data and completes pending data stores. An embodiment of the present invention verifies that a CPU has performed the serialization and has discarded all pre-fetched data. At step 114, the process, starting at step 102, is repeated if there was no error in steps 110 and 112. If there was an error in step 110 or step 112, the process depicted in FIG. 1 is exited with an error message.

Fetch/Store Operations and Block Concurrency Verification

In this section, an embodiment of the present invention that includes the ability to verify the block concurrence of memory locations, altered by register-to-memory and memory-to-memory store operations (e.g., IBM S/390 rx and ss-format, respectively) of different CPUs is described.

Let M be a memory location which may be altered by a number of CPUs. The goal is to test if data fetched by $CPU_j$ from M is valid. It is assumed that immediately after a CPU stores into M all other CPUs can reference M and use the new value. A limitation on the observability of M is due to the fact that the contents of M can be observed only when a given CPU accesses M by executing a fetch-type instruction. For each $CPU_i$ that stores into M, a set or list $L_{CPUi}(M)$, containing the stored data by the CPU is created. Once a particular $CPU_j$ fetches data D from M, an effort is made to determine:

1. which CPU has stored the fetched data; and
2. if the search in step 1 above is successful, then the uniqueness of the data (i.e., whether it was stored by a single $CPU_k$) is checked. If the data is found to be unique, an attempt is made to reduce the set $L_{CPUk}$.

In other words, the existence of D in all $L_{CPU}(M)$s is investigated. An invalid data D has been fetched if D is not found in these sets. On the other hand, if D is a member of one or more of the $L_{CPU}(M)$s, determining the CPU that stored D is performed next. In an exemplary embodiment of the present invention, the way that such a CPU can be identified is if D exists only in a single $L_{CPU}(M)$. If it is determined that $CPU_i$ stored D, then $L_{CPUi}$ is reduced, if possible, by removing all entries that have been stored by CPUi prior to D from the set. Such reduction can be performed since all preceding store operations of $CPU_i$ must have been performed prior to storing D (conceptual sequence). The resulting list, $L_{CPUi}$, is then accessed to evaluate the data from the next fetch instruction that includes data stored by $CPU_i$.

An exemplary embodiment of an algorithm that may be utilized to test block concurrence is shown in FIG. 2. Note that the size of M depends upon the instruction being executed and is an integral of the specified block concurrence. At step 202 in the algorithm, a loop is initiated to retrieve instructions, denoted as "I" in FIG. 2, from the stream, denoted as "S" in FIG. 2. The stream includes a sequence of any number of instructions and may include instructions that access the shared locations. During stream execution, the following information is collected: instructions fetching from or storing into shared locations, the data value being stored, the data value being stored/fetched (if known), a CPU identifier corresponding to the CPU performing the instruction and the address of the instruction relative to other instructions in the stream. For each fetch instruction located, as tested at step 204, the "FOUND" flag is set to false, the "ValidData" flag is set to false and the "UniqueData" flag is set to true. Each fetch instruction also includes a data value, "D", that was fetched. A loop, starting at step 206, is performed for each CPU that utilizes the shared data location, starting with the first CPU, while the "UniqueData" flag is still true. If the "UniqueData" flag is set to false (i.e., the data value "D" has been stored by more than one CPU), then the algorithm depicted in FIG. 2 continues to analyze the next instruction. If the data, "D", is located in the list of stores associated with the current CPU being searched, $L_{CPUi}$, then at step 208, the "ValidData" flag is set to true. This means that the data being verified, "D" has been located and identified as being stored on one of the CPUs, and that "D" is valid data. Next, another loop is performed at step 210 to determine if the data, "D", is also located in a list associated with another CPU. If this is the case, then the "UniqueData" flag is set to false. Otherwise, at step 212, the list associated with the CPU where the data, "D" was located is reduced based on the position of "D" in the list. All data store entries prior to "D" in the list $L_{CPUi}$ are removed. If the data is not located in one of the CPU lists, then the "ERROR" flag is set to true, indicating that the data is invalid and that the block concurrence rules were violated.

For example, assume that $CPU_1$ and $CPU_2$ store into shared data storage, M, the following data values, or "D's".

| $L_{CPU1}$ | $L_{CPU2}$ |
|---|---|
| a | a |
| b | a |
| c | a |
| c | b |
| d | g |
| e | |
| f | |

For purposes of this example, also assume that $CPU_3$ repeatedly executes fetch operations and retrieves "a", "c", "b", "g", and "f" from the shared location. When $CPU_3$ fetches "a", the data fetched may have came from either $CPU_1$ or $CPU_2$. Therefore, although $L_{CPU1}$ and $L_{CPU2}$ cannot be reduced, the data is determined to be valid. When $CPU_3$ fetches "c", the fact that $CPU_1$ is the only one that stored "c" into M implies that "c" is valid data. In addition, the data values "a" and "b", stored by $CPU_1$, are overwritten and are no longer valid data values. Therefore, the lists are reduced as follows.

| $L_{CPU1}$ | $L_{CPU2}$ |
|---|---|
| c | a |
| c | a |
| d | a |
| e | b |
| f | g |

Similarly, when $CPU_3$ reads "b", the sequence of "a's" stored by $CPU_2$ is overwritten and cannot be read. The resulting lists of data are as follows.

| $L_{CPU1}$ | $L_{CPU2}$ |
|---|---|
| c | b |
| c | g |
| d | |
| e | |
| f | |

When $CPU_3$ retrieves "g", the following lists of data result after "b", which has been overwritten by $CPU_2$ is deleted from the list.

| $L_{CPU1}$ | $L_{CPU2}$ |
|---|---|
| c | g |
| c | |
| d | |
| e | |
| f | |

When $CPU_3$ reads "f", then "c", "d" and "e" are no longer valid data values to be fetched because they have been overwritten by $CPU_1$, and the lists of expected data are reduced to the following.

| $L_{CPU1}$ | $L_{CPU2}$ |
|---|---|
| f | g |

In another example, utilizing an exemplary embodiment of the present invention, it is assumed that the store operations of $CPU_1$ and $CPU_2$ happen in a particular order. In this example, $CPU_1$ and $CPU_2$ execute the following store operations.

| $CPU_1$ | $CPU_2$ |
|---|---|
|  | M ⇐ d |
| M ⇐ b |  |
| M ⇐ a |  |
|  | M ⇐ c |
| M ⇐ d |  |

Further, in this example, $CPU_3$ accesses M by executing a sequence of fetch operations. The lists of data observable by for $CPU_3$ are as follows.

| $L_{CPU1}$ | $L_{CPU2}$ |
|---|---|
| b | d |
| a | c |
| d |  |

First, suppose that $CPU_3$ fetches "d". Since "d" is stored by both $CPU_1$ and $CPU_2$ (i.e., it is not unique data), the list of observable data does not get reduced. Next, if $CPU_3$ reads "c" it can be concluded that the fetched data is both valid and unique because "c" appears in only one list. The "d" stored by $CPU_2$ will never be fetched again by $CPU_3$ as stated by the conceptual sequence rules. Therefore, the lists of data that may be observed by $CPU_3$ are reduced as depicted below.

| $L_{CPU1}$ | $L_{CPU2}$ |
|---|---|
| b | c |
| a |  |
| d |  |

Next, in this example, $CPU_3$ retrieves "d". At this time "d" is both valid and unique data. Fetching "d" implies that $CPU_3$ will not be able to observe "c" since all fetches must in order. Also, $CPU_3$ will not be able to fetch the "b" and "a" stored by $CPU_1$ again and the lists of observable data for $CPU_3$ are reduced to the following.

| $L_{CPU1}$ | $L_{CPU2}$ |
|---|---|
| d |  |

Next, is an example where the block concurrency is violated. Suppose the list of $CPU_1$ and $CPU_2$ stored data is the following.

| $L_{CPU1}$ | $L_{CPU2}$ |
|---|---|
| abcd | ijkl |
| efgh |  |

A block concurrency/execution order violation would occur, for example, if $CPU_3$ fetches "ijgh".

Arithmetic/Logical Operations and Block Concurrence

An exemplary embodiment of the present invention checks the conformance of logical and arithmetic operations, that fetch data from shared memory locations, to the block concurrence rules. Such operations are in the form of "A←A<op>B", where "<op>" is a logical or arithmetic operator, "A" is retrieved from and then stored into a register, and "B" is fetched from a shared memory location considered. When B is from a shared memory location, the method creates observable points such that the value loaded into A is available for future analysis. Since both the old and final values of A are known, an exemplary embodiment of the present invention attempts to determine some or all of the bits of B. The method uses reverse operations to find some or all of the bits fetched from the shared locations. Although a strong conclusion cannot be made just by knowing only a portion of B's bits, such portion of the data may be utilized to deduce whether a given CPU "possibly" stored B. The search is performed as described in the previous section except that certain bits of B may not be known. As a result, decisions are made based on possibilities.

In the following example for determining all or a portion of the bits of B, B is fetched from a shared memory location and A is retrieved from and then stored into a register. The bits of A are referred to as "$a_i$" and the bits of B are referred to as "$b_i$". Also, in the example, "$ai_{old}$" is the value of $a_i$ before the store operation is executed and "$ai_{new}$" is the value of $a_i$ after the store is completed. Exemplary calculations for determining all or a portion of the bits in B are described below for logical operations and arithmetic operations.

Logical Operations

XOR $ai_{new}$←$ai_{old}$ XOR $b_i$ $b_i$=$ai_{new}$ XOR $ai_{old}$

AND $ai_{new}$←$ai_{old}$ AND $b_i$ case 1:

($ai_{new}$=1) AND ($ai_{old}$=1)→$b_i$=1 case 2:

($ai_{new}$=0) AND ($ai_{old}$=1)→$b_i$=0 case 3:

($ai_{new}$=0) AND ($ai_{old}$=0)→$b_i$=u case 4:

$$(ai_{new}=1) \text{ AND } (ai_{old}=0) \to b_i=u$$

where "u" denotes unknown.
OR $$ai_{new} \leftarrow ai_{old} \text{ OR } b_i$$

case 1:

$$(ai_{new}=0) \text{ AND } (ai_{old}=0) \to b_i=0$$

case 2:

$$(ai_{new}=1) \text{ AND } (ai_{old}=0) \to b_i=1$$

case 3:

$$(ai_{new}=1) \text{ AND } (ai_{old}=1) \to b_i=u$$

case 4:

$$(ai_{new}=1) \text{ AND } (ai_{old}=1) \to b_i=u$$

Arithmetic Operations
Logical Addition $$A_{new} \leftarrow A_{old} + B$$

$$B = A_{new} - A_{old},$$

where $A_{new}$ is the value of A after the store is completed and $A_{old}$ is the value of A before the store is executed
Logical Subtraction:

$$A_{new} \leftarrow A_{old} - B$$

$$B = A_{old} + A_{new}$$

Multiplication:

The product of multiplying A and B, where both are n bit operands, is placed in a field, "P", of 2*n bits. The most significant bit of the product represents the sign. P may be made up of an even /odd pair of registers (e.g., in the IBM S/390 architecture).

P', A' and B' represent the magnitude of P, A, and B, respectively. Also, s(X) is the sign of X (note that an attempt to find B should not be made if A is equal to zero) and "u" stands for unknown.

P←A*B
B'=P'/A'
   case 1: (s(P)=1) AND (s(A=1)→s(B)=1
   case 2: (s(P)=0) AND (s(A=1)→s(B)=0
   case 3: (s(P)=0) AND (s(A=0)→s(B)=u
   case 4: (s(P)=1) AND (s(A=0)→s(B)=u
Division:
Q'←$A_{old}$/B, where Q' is the quotient
B'=A'/Q'
   case 1: (s(Q)=1) AND (s(A=1)→s(B)=1
   case 2: (s(Q)=0) AND (s(A=1)→s(B)=0
   case 3: (s(Q)=0) AND (s(A=0)→s(B)=u
   case 4: (s(Q)=1) AND (s(A=0)→s(B)=u Additionally, to facilitate the observability of data in a shared memory location, M, after an update operation, A←A<op>B, stores into M, B may be chosen such that portions of the data retrieved by subsequent fetch instructions are "predictable". Logical operations may be utilized to store predictable data into M as shown below.

A←A AND B: ($b_i$=0)→($a_i$=0)

A←A OR B: ($b_i$=1)→($a_i$=1)

In an exemplary embodiment of the present invention, the above list of logical and arithmetic operations may be expanded to include other operations. For example, an embodiment may be extended to nonlogical arithmetic and take into account underflow and overflow by masking the status information bits.

When a shared location is both a source and a target, the analysis becomes more difficult. However, the stream may be biased so that meaningful information may be determined from subsequent fetches. For example, when A (both a target and a source) is from a shared location and B (a source) is from a non-shared location, the logical operations of AND and OR and use B as a mask. If the data stored by this update instruction is observed by any CPU, the mask is used to assure if certain bits are on (for the OR operation) or off (for the AND operation).

An embodiment of the present invention also determines if instruction fetching, from shared locations, obeys specific block concurrence rules as described by the architecture. For example, in the IBM/390 architecture, instruction fetching must be half word block concurrent. If portions of the instruction stream belong to the shared memory, it is possible that some of the CPUs will alter the instruction stream by executing store or update type instructions. Furthermore, the fact that one cannot observe the fetched instructions adds to the complexity of analyzing fetched instructions. In some system architectures (e.g., the IBM S/390), the length of an instruction can be two, four, or six bytes. Once a CPU stores into the stream, one or more instructions may get modified. As an example, storing a six-byte data into the stream can replace three two-byte, one two-byte and one four-byte, or one six-byte instruction(s). As a result of storing into the stream area, some of the executed instructions may not appear in the original stream of instructions since certain CPUs may have altered the stream by storing data into the shared locations. The combination of possible instructions and the operands used by these instructions may become extremely large. However, such combinations can be dramatically reduced by associating certain instructions with particular operands. Without losing generality, further reduction can also be realized by selecting, randomly, the unknown instructions in a given stream to a specific group of instructions. As an example, arithmetic instructions may be selected in one stream and logical instructions in another. To analyze the result (if any) of the fetched instruction, an embodiment of the present invention attempts to determine, or guess, the instruction that would produce the result and then, if such instruction does not belong to the original instruction stream, whether the instruction was inserted into the stream by one of the CPUs. The problem then becomes similar to those described previously except that at this time the fetched data, which is an instruction, was guessed rather than observed.

An example of how this is may be accomplished follows. Let $S_{cpui}$ and $A(S_{cpui})$ be the stream of instructions and their addresses, respectively, that $CPU_i$ is executing as described in the table below.

| $A(S_{cpu1})$ | $S_{cpu1}$ | $A(S_{cpu2})$ | $S_{cpu2}$ |
|---|---|---|---|
| 0000 | $R_2 \Leftarrow R_2 + R_3$ | 0010 | 0002 $\Leftarrow$ 1F21 |
| 0002 | $R_2 \Leftarrow R_2 + R_1$ | | |
| 0004 | $R_2 \Leftarrow R_2 + R_2$ | | |

For simplicity, all instructions affecting $R_2$ are restricted to performing only arithmetic operations. Let the initial values of $R_1$, $R_2$, and $R_3$ be 1, 2, and 3, respectively. In addition, it is assumed that $R_2$ was observed to have the values of 5, 4, and 8. Along with the original stream generated for $CPU_1$, the list of data stored into the stream by $CPU_2$ is available. In this example, such a list includes 1F21 which is equivalent to $R_2 \leftarrow R_2 - R_1$. Based on the instruction stream generated for $CPU_1$, the instruction inserted into that stream by $CPU_2$, and the different values contained by $R_2$, the algorithm checks to see if the executed instructions were fetched properly. The initial value contained by $R_2$ was 2. The second value, 5, can be guessed to be obtained as a result of the add instruction at 0002. It can be assumed that $R_2 \leftarrow R_2 + R_1$ was not executed since such an operation would produce a result of 6. Therefore, guessing that a subtract operation may have been performed by $CPU_1$, the algorithm checks the list of data inserted into the stream by $CPU_2$. Such data confirms the guessing that a subtract operation should be performed if the inserted instruction is executed. A comparison of the result that could be produced by the inserted instruction and the value contained in $R_2$ assure that such an instruction was fetched and executed properly. The above analysis may be extended to the four and six-byte long instructions. It is important to emphasize, that instructions whose lengths are more than two-bytes can result due to different store/update operations of different CPUs. Therefore, the analysis should include investigating if such instructions were due to the actions of a single or different CPUs.

Additionally, locating operands and/or instructions, addressed by the instructions of a stream, may require the use of a translation process before storing into or fetching from implicitly specified locations. The translation process of the IBM S/390 system architecture, for example, involves using tables such as the segment-table and page-table. Similar to the instruction stream case, a translation table designated for a given $CPU_i$ may belong to the shared location. Hence, under certain conditions, one or more CPUs may manage to modify entries of $CPU_i$'s translation table. As a result, some data will be fetched from or stored into different addresses from those specified by the stream that $CPU_i$ initially started executing. Testing th validity of the data fetched from translation tables when CPUs have the capability of altering certain translation table entries can basically be performed as described previously. The process of testing the validity of such data includes investigating whether the modified entries of the translation table are fetched according to the block concurrence rules.

Execution Sequence and Multiple Shared Locations

In an exemplary embodiment of the present invention, verification of the machine compliance to the execution order is based on the fact that all stores (and all fetches) must be executed in order. Once $CPU_i$ observes data stored by $CPU_j$, an exemplary embodiment of the present invention deletes from the observable lists of $CPU_i$ any data stored by $CPU_j$ prior to this store operation. For each CPU that fetches data from shared-locations, copies of all lists of data stored into the shared-locations and the sequence of store operations of each CPU are created. Once $CPU_i$ fetches data from a shared-location and $CPU_j$ is identified to be the processor that stored the data, the lists of stored data by $CPU_j$ (which can be observed by $CPU_i$) may be reduced. The fact that the sequence of all store operations of $CPU_j$ is known allows a reduction in more than one list (i.e., at different memory locations) of data stored by $CPU_j$.

For example, let $M_1$, $M_2$, and $M_3$ be three different shared-memory locations in which $CPU_1$, $CPU_2$, and $CPU_3$ stored the following data.

| $M_1$ | | | $M_2$ | | | $M_3$ | | |
|---|---|---|---|---|---|---|---|---|
| $CPU_1$ | $CPU_2$ | $CPU_3$ | $CPU_1$ | $CPU_2$ | $CPU_3$ | $CPU_1$ | $CPU_2$ | $CPU_3$ |
| a | b | c | a | x | r | c | y | x |
| g | e | f | b | e | f | d | x | y |
| d | i | j | s | n | j | n | p | s |

In addition, the example includes a sequence of store operations of $CPU_2$ as follows:

$M_1 \leftarrow b$ $M_2 \leftarrow x$ $M_3 \leftarrow y$ $M_3 \leftarrow x$ $M_2 \leftarrow e$ $M_2 \leftarrow n$ $M_1 \leftarrow e$ $M_3 \leftarrow p$ $M_1 \leftarrow i$ If $CPU_i$ observes "p" from $M_3$, more than one list of data stored by $CPU_2$ may be reduced after verifying that "p" was stored by $CPU_2$ alone (i.e., is unique and valid data). An exemplary embodiment of the present invention reduces the lists of data stores in the following manner by taking into account that observing the "p" implies that all stores of $CPU_2$ prior to "p" must have happened. After "p" is observed, $CPU_i$ will not observe "y" and "x" from $M_3$. It is also known that $M_1 \leftarrow b$ and $M_1 \leftarrow e$ (by $CPU_2$) took place before $M_3 \leftarrow p$. Therefore, the value "b" (written by $CPU_2$) is overwritten by $M_1 \leftarrow e$. In addition, after "p" is observed, $CPU_i$ will never observe "x" and "e" from $M_2$ because the $CPU_2$ operation of $M_2 \leftarrow n$ happened before the $M_3 \leftarrow p$ operation. An exemplary embodiment of the present invention reduces the lists of data stored into $M_1$, $M_2$ and $M_3$ after "p" is observed as follows.

| $M_1$ | | | $M_2$ | | | $M_3$ | | |
|---|---|---|---|---|---|---|---|---|
| $CPU_1$ | $CPU_2$ | $CPU_3$ | $CPU_1$ | $CPU_2$ | $CPU_3$ | $CPU_1$ | $CPU_2$ | $CPU_3$ |
| a | e | c | a | n | r | c | p | x |
| g | i | f | b |   | f | d |   | y |
| d |   | j | s |   | j | n |   | s |

In addition, in an exemplary embodiment of the present invention, verification of the machine compliance to the left to right order is demonstrated by using the move character (MVC) operation, as an example operation. The MVC operation moves a number of consecutive blocks from one memory location to another. For example, let each of $M_1$, $M_2$, and $M_3$ be one block. If $CPU_2$ executes a MVC that stores into these blocks, and $M_3$ is determined to contain data from that MVC operation, $M_1$ and $M_2$ should not contain any data of previous stores from $CPU_2$. $M_1$ and $M_2$ should have the data stored by the MVC operation or any other store operation that may take place after the MVC. For example, $M_1$, $M_2$ and $M_3$ are three different shared-memory locations into which $CPU_1$, $CPU_2$ and $CPU_3$ store the following data.

| $M_1$ | | | $M_2$ | | | $M_3$ | | |
|---|---|---|---|---|---|---|---|---|
| $CPU_1$ | $CPU_2$ | $CPU_3$ | $CPU_1$ | $CPU_2$ | $CPU_3$ | $CPU_1$ | $CPU_2$ | $CPU_3$ |
| a | b | c | a | x | r | c | y | z |
|   | e | f | b | e | f |   | p |   |
|   |   |   |   |   |   |   |   | y |
|   | i |   | s | n | j |   | x | s |

In addition, the example includes a single instruction performed by $CPU_2$, MVC: $M_1$ $M_2$ $M_3$←"eex", that causes three different stores:

$M_1$←e
$M_2$←e
$M_3$←x.

Finally, the example assumes that the sequence of store operations of $CPU_2$ is as follows.

$M_1$←b
$M_2$←x
$M_3$←y
$M_3$←p
$M_2$←e
$M_2$←n
$M_1$←e
$M_3$←x
$M_1$←i

If $CPU_i$ fetches "x" from $M_3$, then an exemplary embodiment of the present invention reduces the lists of $CPU_2$ observable data in the following manner. The list of $CPU_2$ observable data from $M_3$ is reduced by deleting "y" and "p". The list of $CPU_2$ observable data from $M_2$ cannot contain "x" anymore and the list of $CPU_2$ observable data from $M_1$ cannot contain "b" anymore. The reduced lists are as shown in the following table.

| $M_1$ | | | $M_2$ | | | $M_3$ | | |
|---|---|---|---|---|---|---|---|---|
| $CPU_1$ | $CPU_2$ | $CPU_3$ | $CPU_1$ | $CPU_2$ | $CPU_3$ | $CPU_1$ | $CPU_2$ | $CPU_3$ |
| a | e | c | a | e | r | c | x | z |
|   | i | f | b | n | f |   |   | y |
|   |   |   | s |   | j |   |   | s |

Testing Machine Compliance to Serialization Rules

Although a processor may pre-fetch data for performance purposes, the processor is expected to discard any pre-fetched data when serialization, which is usually trigerred by the execution of certain instructions, is performed. To test if a processor $CPU_b$ obeys the serialization rules, a combination of $CPU_a$ fetches and the stores of $CPU_b$, may be used. To make a meaningful conclusion about $CPU_b$'s compliance to the serialization rules, it must be known that the data fetched by $CPU_a$ from M is not the last store of $CPU_b$ into M. The exemplary serialization verification algorithm shown in FIG. 3 attempts to eliminate the stores of $CPU_a$ that should not be observed by $CPU_b$, and vice versa. The algorithm takes advantage of instructions known to cause serializations. For each CPU, it is assumed that lists of all its stores into and fetches from the shared locations are available.

If $CPU_a$ fetches data stored by $CPU_b$ and it is determined that the data could have been overwritten by another store of $CPU_b$, a correlation can be made between some of the processors' streams. $Ser_{i,\ CPUa}$ denotes the serialization point that precedes the $CPU_a$ fetch and $Ser_{j,\ CPUb}$ denotes the serialization point that follows the closest store of $CPU_b$ that potentially could overwrite the data. When $CPU_a$ fetches data stored by $CPU_b$, a cross reference point (CRP), which is a pair of serialization points $Ser_{i,\ CPUa}$ and $Ser_{j,\ CPUb}$ is created to indicate that, after $Ser_i$, $CPU_a$ observed that $CPU_b$ did not execute/reach its serialization instruction at $Ser_j$. A subset of $CPU_a$ fetches known to be stored only by $CPU_b$ is selected from the set containing $CPU_a$ fetches. A CRP is created for $CPU_a$ if a store into a memory location by $CPU_b$ is fetched by $CPU_a$ and it is determined that there is at least another store of $CPU_b$ that could potentially overwrite the data. For a given serialization point, at most one CRP can be defined. If a new CRP=($Ser_{i,\ CPUa}$, $Ser_{j,\ CPUb}$) is to be created for $CPU_a$, a check is made to determine if $CPU_a$ already has another CRP=($Ser_{i,\ CPUa}$, $Ser_{k,\ CPUb}$). If one already exists, the most restrictive CRP is kept. In other words if k is less than j, the new CRP replaces the previous one.

Referring to an exemplary embodiment of an algorithm for testing machine compliance to serialization rules as depicted in FIG. 3, the terms used in FIG. 3 are defined below:

$F_{CPUi}$=$F_{CPUi}$(M)=List of CPUi fetches from M;

$St_{CPUi}$=List of stores of $CPU_i$;

$St_{CPUi}$(M)=List of stores of $CPU_i$ into M;

$OW_{CPUi}$(M)=store operation of $CPU_i$ that can overwrite the observed data from M; and $S_{(Ser_n,\ CPUi)}$=list of $CPU_1$ stores that took place after $Ser_n$ and all accumulated stores up to $Ser_n$.

At step 302 in FIG. 3, a loop is initiated for each pair of CPU's, referred to as each pair of $CPU_a$ and $CPU_b$. The instructions labeled 304 initiate the building of CRP's for $CPU_b$ and the checking of $CPU_b$ fetches against $CPU_a$ stores. This is accomplished by invoking the instructions denoted 308 to create CRPs for $CPU_b$ (because "y" has been set to "b"). For each $CPU_a$ fetch (because "x" has been set to "a") of data stored by $CPU_b$ into M, if other stores of $CPU_b$ that could overwrite M did not take place, a CRP is created or updated. The instructions labeled 310 are also invoked by step 304 to check the $CPU_b$ fetches against the $CPU_a$ stores and the CRPs. These instructions are utilized to determine if $CPU_b$ violated serialization rules. At step 306, the values for "b" and "y" are swapped and the reverse checking takes place: CRP's for $CPU_a$ are built and $CPU_a$ fetches are checked against the $CPU_b$ stores. The algorithm depicted in FIG. 3 is performed for each pair of CPU's that utilize the shared memory location.

An example of the processing performed by the algorithm depicted in FIG. 3 is described below and assumes store and fetch instructions as shown in the following table. The numbers represent the order of each individual instruction in the stream. The "$" denotes a serialization point.

| $CPU_1$ | | | $CPU_2$ | | |
|---|---|---|---|---|---|
| 2 | $M_1$ ⇐ | $A_1$ | 4 | $M_2$ ⇐ | $B_1$ |
| 8 | $M_1$ ⇐ | $A_2$ | 7 | $M_2$ ⇐ | $B_2$ |
| 9 | $ | | 12 | $ | |
| 16 | $M_1$ ⇐ | $A_3$ | 20 | $M_2$ ⇐ | $B_3$ |
| 18 | $M_1$ ⇐ | $A_4$ | 22 | $M_2$ ⇐ | $B_4$ |
| 20 | $ | | 24 | $ | |
| 23 | $R_3$ ⇐ | $M_2$ | 25 | $R_2$ ⇐ | $M_1$ (fetch $A_2$) |
| 24 | $M_1$ ⇐ | $A_5$ | 30 | $M_2$ ⇐ | $B_5$ |

-continued

| | CPU$_1$ | | CPU$_2$ |
|---|---|---|---|
| 28 | R$_1$ ⇐ M$_2$ (fetch B$_1$) | 32 | R$_4$ ⇐ M$_1$ (fetch A$_5$) |
| 35 | M$_1$ ⇐ A$_6$ | 38 | M$_2$ ⇐ B$_6$ |
| 40 | $ | 50 | $ |

Figure 4:
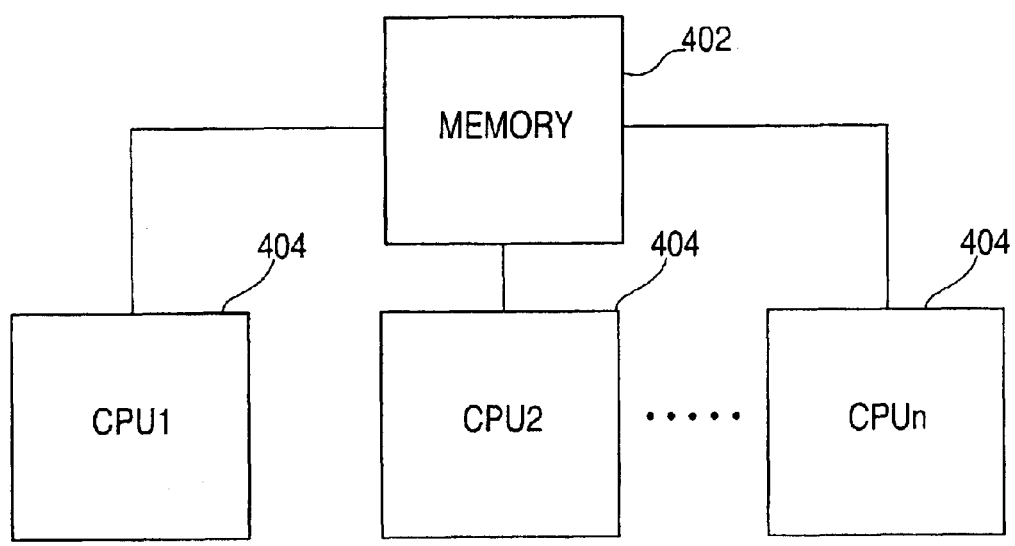
FIG. 4 is a block diagram of an exemplary system for testing the validity of shared data in a multiprocessing system.

After CPU$_1$, observes B$_1$ a CRP=(20,12) is created to signify that all CPU$_2$ fetches after the serialization point at 12 can observe only the latest copies of all stores prior to the CPU$_1$ serialization at 20. As a result A$_1$, A$_2$ and A$_3$ cannot be observed by any fetch instruction of CPU$_2$ that follows in sequence the serialization instruction at 12. Any CPU$_2$ fetch that retrieves these data would indicate violation in serialization rules. As an example, the CPU$_2$ fetch at 32 is valid, as far as the serialization is concerned. On the other hand, the fetch at 25 indicates that CPU$_2$ is using a pre-fetched data and failed to discard it after it serialized at 12. FIG. 4 block diagram of an exemplary system for testing the validity of shared data in a multiprocessing system. It includes several CPUs 404 that have access to the same shared memory location 402. Any type of CPU known in the art may be utilized in an exemplary embodiment of the present invention along with any type of memory capable of being shared by two or more processors. In an exemplary embodiment the CPUs 404 have an IBM S/390 architecture and the memory 402 is a direct access storage device (DASD). The example depicted in FIG. 4 has "n" CPUs accessing the shared memory location 404, where "n" may be any integer higher than one. In addition, each of the CPUs 404 include computer instructions to test the validity of shared data in a multiprocessing system.

An embodiment of the present invention provides for testing data block concurrency, execution sequence and serialization in multiprocessing systems. Each CPU in the multiprocessing system may store random data into shared memory locations. The method allows one or more CPUs to store identical data into the same memory location. In addition, an embodiment of the present invention tests the validity of a data fetch by a given CPU under a pipe-lines and dynamic environment. The method is applicable to any size of block concurrent update. Instruction fetching of the IBM System 390 architecture, for example, is half-word block concurrent while operands of arithmetic and logical operations are word or double-word or more (e.g., quad-word) block concurrent. Additionally, an embodiment of the present invention takes into account stores and fetches caused by arithmetic and local operations engaging in register-to-memory and memory-to-memory data transfer operations. An embodiment of the present invention also handles the case where an instruction stream and/or translation table are subject to modifications due to the actions of some of the CPUs.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for testing the validity of shared data in a multiprocessing system, the method comprising:
   receiving at a first central processing unit a list of fetch and store instructions associated with blocks in a shared memory location, the list including: at least one data value, at least one central processing unit identifier and a relative order associated with the instructions, wherein:
      one of said data values associated with one of said instructions was stored by a memory-to-memory, memory-to-register or register-to-memory operation; and
      one of said central processing unit identifiers associated with one of said instructions is an identifier corresponding to one of a plurality of central processing units that have access to said shared memory location including said first central processing unit;
   performing a fetch operation at a block in said shared memory location from said first central processing unit;
   receiving fetched data at said first central processing unit in response to said performing, wherein said fetched data was stored by one of said plurality of central processing units;
   verifying that said fetched data conforms to a block concurrency rule in response to said list, the verifying including identifying a source central processing unit from said plurality of central processing units for said fetched data by scanning said list for said fetched data and reducing said list in response to said fetched data appearing once on said list; and
   checking that said fetched data conforms to a serialization rule in response to said list.

2. The method of claim 1 further including testing said fetched data for conformance to an execution order rule.

3. The method of claim 2 wherein said execution order rule includes an execution sequence between two or more of said blocks in a shared memory location.

4. The method of claim 2 wherein said execution order rule includes compliance to left to right order when a single operation moves multiple consecutive said blocks.

5. The method of claim 2 wherein said execution order rule includes testing execution order between instructions.

6. The method of claim 2 wherein said execution order rule includes testing execution within a single instruction.

7. The method of claim 1 wherein said fetched data was stored by a load operation or a store operation.

8. The method of claim 1 wherein said fetched data was stored by a logical operation.

9. The method of claim 1 wherein said fetched data was stored by an arithmetic operation.

10. The method of claim 1 wherein said fetched data was stored by a storage-to-storage operation.

11. The method of claim 1 wherein said verifying that said data conforms to a block concurrency rule includes:
    setting a found flag to false;
    setting a valid data flag to false;
    setting a unique data flag to true;
    searching for a first data entry containing said fetched data in said list;
    setting said valid data flag to true in response to locating said fetched data;
    searching for a second data entry containing said fetched data in said list in response to setting said valid data flag to true;
    setting said unique data flag to false in response to locating said second data entry;
    eliminating instructions in said list that were stored earlier than said first data entry and that correspond to said central processing unit associated with said first data entry in response to said unique data flag being equal to true; and
    transmitting an error message if said error flag is set to true.

12. The method of claim 1 wherein said blocks are half-words.

13. The method of claim 1 wherein said blocks are words.

14. The method of claim 1 wherein said blocks are double-words.

15. The method of claim 1 wherein said list includes two said data values that are the same.

16. The method of claim 1 wherein said performing a fetch operation is in a pipe-lined environment.

17. The method of claim 1 wherein said performing a fetch operation is in a dynamic environment.

18. The method of claim 1 wherein said checking that said fetched data conforms to a serialization rule includes:
    creating a first cross reference point in said list for a second central processing unit included in said plurality of central processing units, wherein said first cross reference point includes a serialization point for said first central processing unit and a serialization point for said second central processing unit;
    checking said second central processing unit fetches included in said list against said first central processing unit stores in said list and said first cross reference point;
    creating a second cross reference point in said list for said first central processing unit, wherein said second cross reference point includes a said serialization point for said second central processing unit and a said serialization point for said first central processing unit; and
        checking said first central processing unit fetches included in said list against said second central processing unit stores in said list and said second cross reference point.

19. The method of claim 1 further comprising executing reverse operations to determine a bit stored into the shared memory location, wherein the bit is input to said verifying (one bit implies one or more bits and verifying is block concurrency step).

20. The method of claim 1 wherein the shared memory location includes an instruction stream.

21. A system for testing the validity of shared data in a multiprocessing system, the system comprising:
    a plurality of central processing units including a first central processing unit;
    a shared memory location accessed by said plurality of central processing units;
    application software located on said first central processing unit for implementing the method comprising:
        receiving at said first central processing unit a list of fetch and store instructions associated with blocks in the shared memory location, the list including: at least one data value, at least one central processing unit identifier and a relative order associated with the instructions, wherein:
            one of said data values associated with one of said instructions was stored by a memory-to-memory, memory-to-register or register-to-memory operation; and
            one of said central processing unit identifiers associated with one of said instructions is an identifier corresponding to one of said plurality of central processing units;
        performing a fetch operation at a block in said shared memory location from said first central processing unit;
        receiving fetched data at said first central processing unit in response to said performing, wherein said fetched data was stored by one of said plurality of central processing units;
        verifying that said fetched data conforms to a block concurrency rule in response to said list, the verifying including identifying a source central processing unit from said plurality of central processing units for said fetched data by scanning said list for said fetched data and reducing said list in response to said fetched data appearing once on said list; and
        checking that said fetched data conforms to a serialization rule in response to said list.

22. The system of claim 21 wherein said verifying that said fetched data conforms to a block concurrency rule includes:
    setting a found flag to false;
    setting a valid data flag to false;
    setting a unique data flag to true;
    searching for a first data entry containing said fetched data in said list;
    setting said valid data flag to true in response to locating said fetched data;
    searching for a second data entry containing said fetched data in said list in response to setting said valid data flag to true;
    setting said unique data flag to false in response to locating said second data entry;
    eliminating instructions in said list that were stored earlier than said first data entry and that correspond to said central processing unit associated with said first data entry in response to said unique data flag being equal to true; and
    transmitting an error message if said error flag is set to true.

23. The system of claim 21 wherein said checking that said fetched data conforms to a serialization rule includes:
creating a first cross reference point in said list for a second central processing unit included in said plurality of central processing units, wherein said first cross reference point includes a serialization point for said first central processing unit and a serialization point for said second central processing unit;
checking said second central processing unit fetches included in said list against said first central processing unit stores in said list and said first cross reference point;
creating a second cross reference point in said list for said first central processing unit, wherein said second cross reference point includes a said serialization point for said second central processing unit and a said serialization point for said first central processing unit; and
checking said first central processing unit fetches included in said list against said second central processing unit stores in said list and said second cross reference point.

24. A computer program product for testing the validity of shared data in a multiprocessing system, the computer program product comprising:
a storage medium readable by a processing circuit and storing instructions for execution by the processing circuit for performing a method comprising:
receiving at a first central processing unit a list of fetch and store instructions associated with blocks in a shared memory location, the list including: at least one data value, at least one central processing unit identifier and a relative order associated with the instructions, wherein:
one of said data values associated with one of said instructions was stored by a memory-to-memory, memory-to-register or register-to-memory operation; and
one of said central processing unit identifiers associated with one of said is an identifier corresponding to one of a plurality of central processing units that have access to said shared memory location including said first central processing unit;
performing a fetch operation at a block in said shared memory location from said first central processing unit;
receiving fetched data at said first central processing unit in response to said performing, wherein said fetched data was stored by one of said plurality of central processing units;
verifying that said fetched data conforms to a block concurrency rule in response to said list, the verifying including identifying a source central processing unit from said plurality of central processing units for said fetched data by scanning said list for said fetched data and reducing said list in response to said fetched data appearing once on said list; and
checking that said fetched data conforms to a serialization rule in response to said list.

25. A method for testing the validity of shared data in a multiprocessing system, the method comprising:
receiving at a first central processing unit a list of fetch and store instructions associated with blocks in a shared memory location, the list including: at least one data value, at least one central processing unit identifier and a relative order associated with the instructions, wherein:
one of said data values associated with one of said instructions was stored by a memory-to-memory, memory-to-register or register-to-memory operation; and
one of said central processing unit identifiers associated with one of said instructions is an identifier corresponding to one of a plurality of central processing units that have access to said shared memory location including said first central processing unit;
performing a fetch operation at a block in said shared memory location from said first central processing unit;
receiving fetched data at said first central processing unit in response to said performing, wherein said fetched data was stored by one of said plurality of central processing units;
verifying that said fetched data conforms to a block concurrency rule in response to said list;
checking that said fetched data conforms to a serialization rule in response to said list; and
testing said fetched data for conformance to an execution order rule, wherein the execution order rule includes compliance to left to right order when a single operation moves multiple consecutive blocks.

26. A method for testing the validity of shared data in a multiprocessing system, the method comprising:
receiving at a first central processing unit a list of fetch and store instructions associated with blocks in a shared memory location, the list including: at least one data value, at least one central processing unit identifier and a relative order associated with the instructions, wherein:
one of said data values associated with one of said instructions was stored by a memory-to-memory, memory-to-register or register-to-memory operation; and
one of said central processing unit identifiers associated with one of said instructions is an identifier corresponding to one of a plurality of central processing units that have access to said shared memory location including said first central processing unit;
performing a fetch operation at a block in said shored memory location front said first central processing unit;
receiving fetched data at said first central processing unit in response to said performing, wherein said fetched data was stored by one of said plurality of central processing units;
verifying that said fetched data conforms to a block concurrency rule in response to said list, including:
setting a found flag to false;
setting a valid data flag to false;
setting a unique data flag to true;
searching for a first data entry containing said fetched data in said list;
setting said valid data flag to true in response to locating said fetched data;
searching for a second data entry containing said fetched dam in said list in response to setting said valid data flag to true;
setting said unique data flag to false in response to locating said second data entry;
eliminating instructions in said list that were stored earlier than said first data entry and that correspond to said central processing unit associated with said first data entry in response to said unique data flag being equal to true; and transmitting an error message if said error flag is set to true; and checking that said fetched data conforms to a serialization rule in response to said list.

27. A method for tasting the validity of shared data in a multiprocessing system, the method comprising:

receiving at a first central processing unit a list or fetch and store instructions associated with half-word blocks in a shared memory location, the list including: at least one data value, at least one central processing unit identifier and a relative order associated with the instructions, wherein;

one of said data values associated with one of said instructions was stored by a memory-to-memory, memory-to-register or register-to-memory operation; and one of said central processing unit identifiers associated with one of said instructions is an identifier corresponding to one of a plurality of central processing units that have access to said shared memory location including said first central processing unit;

performing a fetch operation at a half-word block in said shared memory location from said first central processing unit;

receiving fetched data at said first central processing unit in response to said performing, wherein said fetched data was stored by one of said plurality of central processing units;

verifying that said fetched data conforms to a block concurrency rule in response to said list; and checking that said fetched data conforms to a serialization rule in response to said list.

28. A method for testing the validity of shared data in a multiprocessing system, the method comprising:

receiving at a first central processing unit a list of fetch and stare instructions associated with word blocks in a shared memory location, the list including: at least one data value, at least one central processing unit identifier and a relative order associated with the instructions, wherein;

one of said data values associated with one of said instructions was stored by a memory-to-memory, memory-to-register or register-to-memory operation; and one of said central processing unit identifiers associated with one of said instructions is an identifier corresponding to one of a plurality of central processing units that have access to said shared memory location including said first central processing unit;

performing a fetch operation at a word block in said shared memory location from said first central processing unit;

receiving fetched data at said first central processing unit in response to said performing, wherein said fetched data was stored by one of said plurality of central processing units;

verifying that said fetched data conforms to a block concurrency rule in response to said list; and checking that said fetched data conforms to a serialization rule in response to said list.

29. A method for testing the validity of shared data in a multiprocessing system, the method comprising:

receiving at a first central processing unit a list of fetch and store instructions associated with double-word blocks in a shared memory location, the list including: at least one data value, at least one central processing unit identifier and a relative order associated with the instructions, wherein:

one of said data values associated with one of said instructions was stored by a memory-to-memory, memory-to-register or register-to-memory operation; and one of said central precessing unit identifiers associated with one of said instructions is an identifier corresponding to one of a plurality of central processing units that have access to said shared memory location including said first central processing unit;

performing a fetch operation at a double-word block in said shared memory location from said first central processing unit;

receiving fetched data at said first central processing unit in response to said performing, wherein said fetched data was stored by one of said plurality of central processing units;

verifying that said fetched data conforms to a block concurrency rule in response to said list; and checking that said fetched data conforms to a serialization rule in response to said list.

30. A method for testing the validity of shared data in a multiprocessing system, the method comprising:

receiving at a first central processing unit a list of fetch and store instructions associated with blocks in a shared memory location, the list including: at least one data value, at least one central processing unit identifier and a relative order associated with the instructions, wherein:

one of said data values associated with one of said instructions was stored by a memory-to-memory, memory-to-register or register-to-memory operation; and one of said central processing unit identifiers associated with one of said instructions is an identifier corresponding to one of a plurality of central processing units that have access to said shared memory location including said first central processing unit;

performing a fetch operation at a block in said shared memory location from said first central processing unit;

receiving fetched data at said first central processing unit in response to said performing, wherein said fetched data was stored by one of said plurality of central processing units;

verifying that said fetched data conforms to a block concurrency rule in response to said list; and checking that said fetched data conforms to a serialization rule in response to said list, including:

creating a first cross reference point in said list for a second central processing unit included in said plurality of central processing units, wherein said first cross reference point includes a serialization point for said first central processing unit and a serialization point for said second central processing unit;

checking said second central processing unit fetches included in said list against said first central processing unit stores in said list end said first cross reference point;

creating a second cross reference point in said list for said first central processing unit, wherein said second cross reference point includes a said serialization point for said second central processing unit and a said serialization point for said first central processing unit; and checking said first central processing unit fetches included in said list against said second central processing unit stores in said list and said second cross reference point.

31. A system for testing the validity of shared data in a multiprocessing system, the system comprising:
- a plurality of central processing units including a first central processing unit;
- a shored memory location accessed by said plurality of central processing units;
- application software located on said first central processing unit for implementing the method comprising:
  - receiving at said first central processing unit a list of fetch and store instructions associated with blocks in the shared memory location, the list including: at least one data value, at least one central processing unit identifier and a relative order associated with the instructions, wherein:
    - one of said data values associated with one of said instructions was stored by a memory-to-memory, memory-to-register or register-to-memory operation; and
    - one of said central processing unit identifiers associated with one of said instructions is an identifier corresponding to one of said plurality of central processing units;
  - performing a fetch operation at a block in said shared memory location from said first central processing unit;
  - receiving fetched data at said first central processing unit in response to said performing, wherein said fetched data was stored by one of said plurality of central processing units;
  - verifying that said fetched data conforms to a block concurrency rule in response to said list, including:
    - setting a found flag to false;
    - setting a valid data flag to false;
    - setting a unique data flag to true;
    - searching far a first data entry containing said fetched data in said list;
    - setting said valid data flag to true in response to locating said fetched data;
    - searching for a second data entry containing said fetched data in said list in response to setting said valid data flag to true;
    - setting said unique data flag to false in response to locating said second data entry;
    - eliminating instructions in said list that were stored earlier than said first data entry and that correspond to said central processing unit associated with said first data entry in response to said unique data flag being equal to true; and
    - transmitting an error message if said error flag is set to true; and
  - checking that said fetched data conforms to a serialization rule in response to said list.

32. A system for testing the validity of shared data in a multiprocessing system, the system comprising:
- a plurality of central processing units including a first central processing unit;
- a shared memory location accessed by said plurality of central processing units;
- application software located on said first central processing unit for implementing the method comprising:
  - receiving at said first central processing unit a list of fetch and store instructions associated with blocks in the shared memory location, the list including: at least one data value, at least one central processing unit identifier and a relative order associated with the instructions, wherein:
    - one of said data values associated with one of said instructions was stored by a memory-to-memory, memory-to-register or register-to-memory operation; and
    - one of said central processing unit identifiers associated with one of said instructions is an identifier corresponding to one of said plurality of central processing units;
  - performing a fetch operation at a block in said shared memory location from said first central processing unit;
  - receiving fetched data at said first central processing unit in response to said performing, wherein said fetched data was stored by one of said plurality of central processing units;
  - verifying that said fetched data conforms to a block concurrency rule in response to said list; and
  - checking that said fetched data conforms to a serialization rule in response to said list, including:
    - creating a first cross reference point in said list for a second central processing unit included in said plurality of central processing units, wherein said first cross reference point includes a serialization point for said first central processing unit and a serialization point for said second central processing unit;
    - checking said second central processing unit fetches included in said list against said first central processing unit stores in said list and said first cross reference point;
    - creating a second cross reference point in said list for said first central processing unit, wherein said second cross reference point includes a said serialization point for said second central processing unit and a said serialization point for said first central processing unit; and
    - checking said first central processing unit fetches included in said list against said second central processing unit stores in said list and said second cross reference point.

* * * * *